United States Patent
Dragone

(10) Patent No.: US 6,907,160 B2
(45) Date of Patent: Jun. 14, 2005

(54) APPARATUS FOR FILTERING OPTICAL SIGNALS

(75) Inventor: Corrado Dragone, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 70 days.

(21) Appl. No.: 10/421,571

(22) Filed: Apr. 23, 2003

(65) Prior Publication Data

US 2004/0213520 A1 Oct. 28, 2004

(51) Int. Cl.$^7$ .................................................. G02B 6/28
(52) U.S. Cl. .............................. 385/24; 385/37; 385/47
(58) Field of Search ............................ 385/24, 37, 46, 385/47, 84; 398/84

(56) References Cited

U.S. PATENT DOCUMENTS

| | | | | |
|---|---|---|---|---|
| 5,953,467 A | * | 9/1999 | Madsen ........................ | 385/15 |
| 6,023,544 A | | 2/2000 | Dragone ....................... | 385/37 |
| 6,212,315 B1 | * | 4/2001 | Doerr ........................... | 385/31 |
| 6,493,487 B1 | * | 12/2002 | Temkin et al. ................. | 385/37 |
| 6,597,842 B2 | * | 7/2003 | Dent et al. ..................... | 385/39 |
| 6,690,846 B2 | * | 2/2004 | Zhou et al. .................... | 385/15 |

OTHER PUBLICATIONS

Nishi et al., Broad–Passband–Width Optical Filter For Multi/Demultiplexer Using a Diffraction Grating and a Retroreflector Prism, Electronics Letters, May 9, 1985, vol. 21, No. 10, pp. 423–424.

Doerr, C.R., "Proposed WDM Cross Connect Using a Planar Arrangement of Waveguide Grating Routers and Phase Shifters," IEEE Photon. Technol. Lett., vol. 10, No. 4, pp. 528–530, Apr. 1998.

Doerr, C.R., et al., "Arrayed Waveguide Lens Wavelength Add–Drop in Silica," IEEE Photon. Technol. Lett., vol. 11, No. 5, pp. 557–559, May 1999.

Thompson, G.H.B., et al., "An Original Low–Loss and Pass–band Flattened SiO2 on Si Planar Wavelength Demultiplexer" OFC '98 Technical Digest, Feb. 1998, p. 77.

Dragone, C., "Efficient Techniques for Widening the Passband of a Waveguide Router," Journal of Lightwave Technology, vol. 16, No. 16, Oct. 1998, pp. 1895–1906.

Dragone, C., "An N x N Optical Multiplexer Using a Planar Arrangement of Two Star Couplers," IEEE Photon. Technol. Lett., 3, pp. 812–815, 1991.

* cited by examiner

Primary Examiner—Leo Boutsikaris

(57) ABSTRACT

Apparatus for filtering an optical input signal includes a coupler and an arrayed waveguide grating connected to the coupler having a phase shifting region. The phase shifting region is a back wall of a free space region of the arrayed waveguide grating with concentric image and reflector surfaces. Radial waveguides between the surfaces are divided into alternating regions of wider and thinner sets of waveguides. A corresponding change in optical length alters the phase of the input signal which forces an output signal of a desired wavelength to appear at a desired port of the filter.

25 Claims, 4 Drawing Sheets

APPARATUS FOR FILTERING OPTICAL SIGNALS

FIELD OF INVENTION

The invention relates generally to the field of optical communications and, more specifically, to an apparatus for slicing or interleaving individual wavelength signals with improved passband transfer function characteristics.

BACKGROUND OF INVENTION

Channel adding/dropping filters in high quality optical networks form a key functional element in dense wavelength-division multiplexed (DWDM) optical fiber networks. They are used to either separate (slice) or multiplex (interleave) signals that are on equally spaced apart channels (wavelengths). For example, a typical 1×2 coupler is connected such that a single input port receives a DWDM signal and two output ports provide the sliced DWDM signal into odd and evenly spaced channels respectively for further slicing and/or processing. Such a coupler may also have its connections reversed so as to perform a multiplexing operation. Unfortunately, such devices do not have a constant gain transfer function in the passbands when functioning as a slicer. That is, as the individual wavelengths are separated from the incoming signal, they lose signal quality because the optimal rectangular response desired in such device is not realized. One attempt to improve this condition is to pass the incoming DWDM signal through multiple stages of Mach-Zhender devices to achieve a flatter and more rectangular response. This approach is not always effective because of the inherently varied manufacturing tolerances of each devices and is generally inopposite to the concept of having integrated optical techniques for signal processing.

SUMMARY OF THE INVENTION

These and other deficiencies of the prior art are addressed by the present invention of an apparatus for filtering an optical input signal. The apparatus is a filter having at least one coupler and at least one arrayed waveguide grating connected to the coupler and having a phase shifting region. In one embodiment, the coupler is a single 2×2 coupler having a first input port, a second input port, a first output port and a second output port. The first output port is connected to a filter lower arm and a reflector and the second output port is connected to a filter upper arm and the arrayed waveguide grating. The phase shifting region is a back wall of a free space region of the arrayed waveguide grating and includes an image surface and a reflector surface arranged concentrically. An array formed by a plurality of radial waveguides is located between an image surface and a reflector surface. The array is divided into alternating regions or segments of a first set radial waveguides and a second set of radial waveguides. The first set of radial waveguides has greater optical length than the second set of radial waveguides. In an alternate embodiment, the back wall of the free space region has a curved image surface and a flat reflector surface spaced apart from each other with a plurality of curved waveguides between image surface and a reflector surface.

In a second embodiment of the invention, the filter includes a first 2×2 coupler and a second 2×2 coupler. A first arrayed waveguide grating and a second arrayed waveguide grating are connected to each other between an output port of the first 2×2 coupler and an input port of the second 2×2 coupler. The first arrayed waveguide grating and the second arrayed waveguide grating are connected to each other via a waveguide array. The array is made up of alternating regions of varying optical length of the individual waveguides.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention will be primarily described within the context of an optical add-drop filter which may be used in wavelength-division multiplexed (WDM) and dense WDM (DWDM) optical communications systems. However, it will be appreciated by those skilled in the art that the invention may be advantageously employed in any optical communications system in which it is desirable to maintain a substantially rectangular transfer function in the relevant passbands.

Figure 1:
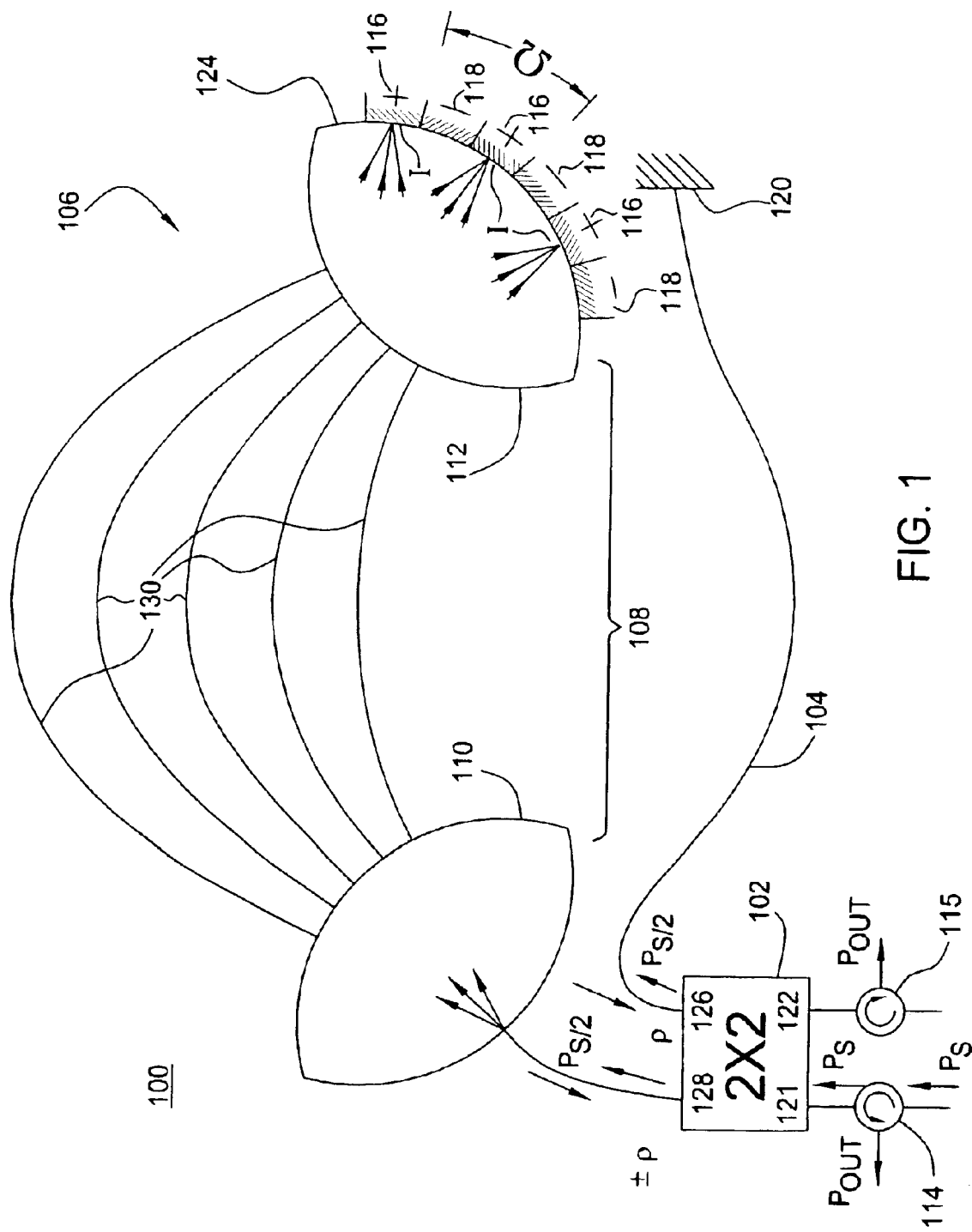
FIG. 1 depicts a high level block diagram of an optical add-drop filter according to an embodiment of the present invention.

FIG. 1 depicts a high level block diagram of an optical add-drop filter according to an embodiment of the present invention. Specifically, the filter 100 of FIG. 1 comprises a coupler 102, a waveguide grating router 108, a reflector 120 and a plurality of circulators 114 and 115. The filter 100 receives an input signal Ps, illustratively a WDM or DWDM optical signal comprising N optical signals having respective wavelengths $\lambda_1$-$\lambda_N$ and transported via an optical fiber. The filter 100 responsively produces a corresponding output signal Pout at a specific output port of the coupler 102 (depending upon the phase characteristics as explained below). The filter 100 operates to controllably pass through, insert (add) and/or extract (drop) optical communications signals having specified wavelengths to implement thereby the known add-drop function.

Specifically, the input optical signal Ps is applied to one of a first input port 121 or a second input port 122 of the coupler 102. FIG. 1 depicts the optical input signal Ps being applied to the first input port 121 via first circulator 114. The coupler 102 has two output ports, each of which are connected to an arm. For example, a first output port 126 is connected to a lower arm 104 and a second output port 128 is connected to an upper arm 106. The lower arm 104 is connected to a reflector 120. The upper arm 106 consists of a waveguide grating router 108 combined with a reflector arrangement 124. Both the lower arm 104 and the upper arm 106 are approximately of the same optical length; however, they are designed to have different reflection coefficient properties. Particularly in one embodiment, the lower arm 104 has a reflection coefficient of $\rho$ and the upper arm 106 has a reflection coefficient of $\pm\rho$ (where $\pm\rho$ varies periodically as a function of the wavelength of the input signal Ps).

Lastly, circulators 115 and 114 respectively are provided at each of the first input port 121 and the second input port 122. The circulators 114 and 115 permit the input signal Ps to be applied to the filter 100 and have a reflected output signal also appear at the same input port, yet do not interfere with one another. That is, the circulator passes the reflected output signal Pout to a separate branch of the circulator than the applied signal Ps.

In operation, the input signal Ps is applied to either of the input ports 121 or 122 of the coupler 102. The coupler 102 then splits the input signal Ps into two substantially equal component signals Ps/2 which are respectively provided to the upper arm 106 and lower arm 104. Each respective component signal Ps/2 is then reflected back with substantially equal magnitude in its respective arm 104, 106. The filter 100 is so configured that when the reflected component signals are in phase, the resultant output signal Pout is provided to the input port 121 or 122 to which the input signal Ps was applied and when the reflected component signals are out of phase, the resultant output signal Pout is provided to the input port to which the input signal Ps was not applied. Regardless of where the output signal is seen, such port displays a substantially rectangular transfer function characteristic.

The configuration of the waveguide grating router (WGR) 108 is directly linked to the sign duality of the reflection coefficient (±$\rho$) and the resultant output signal Pout routing to the first or second input ports 121 and 122. Specifically, the waveguide grating router 108 comprises a first free space region 110, a second free space region 112 and a plurality of arrayed waveguides 130 disposed therebetween on the upper arm 106. This arrangement transforms the component signal Ps/2 of the upper arm 106 into a set of output images I (a result of a series of convergent rays) produced on a back wall (or image circle) 124 of the second free space region 112. The output images I are physically equally spaced apart by an arc distance $\Omega$ and their locations on the image circle 124 are approximately linear functions of the wavelength of the input signal Ps. By using a suitable reflector, all of the images I are reflected back with negligible loss. A suitable circular reflector producing a constant reflection along a circle can be realized by for example cutting and polishing a portion of a the wafer along a circle.

The back wall or image circle 124 of the second free space region 112 is not a single reflector device, but a dual reflector device. Specifically, the back wall 124 is a segmented arrangement made up of a plurality of first reflective regions 116 (denoting an original wavelength characteristic) and a plurality of second reflective regions 118 (denoting a phase-shifted wavelength characteristic). The first reflective regions 116 and second reflective regions 118 are interspersed segments of width $\Omega/2$ along the back wall 124. The second reflective regions 118 are configured to impart a predetermined phase shift $\pi$ to the input signal Ps with respect to that imparted by the adjacent first reflective regions 116. Accordingly, the reflection coefficient of the upper arm 106 is characterized by ±$\rho$, which is governed by the phase shift $\pi$ between the first reflective regions 116 and the second reflective regions 118. In other words, since the input signal Ps comprises various signal components ($\lambda_n$) of variable wavelengths, the resultant image I will linearly vary along the back wall 124 of the second free space region 112. Dependant upon such wavelength, the image will either (1) appear in the first reflective region 116, maintain its phase with respect to the input signal Ps and have a reflection coefficient of +$\rho$; or (2) appear in the second reflective region 118, have its phase shifted by a value of $\pi$ and have a reflection coefficient of −$\rho$. If the reflection coefficient in the upper arm is +$\rho$, the output signal Pout will appear at the first input port 121 via the circulator 114 (as this is the port that the input signal Ps was initially applied. If the reflection coefficient in the upper arm is −$\rho$, the output signal Pout will appear at the second input port 122 via second circulator 115.

It should be noted that unavoidable losses in the waveguide grating of the upper arm 106 will cause the magnitude of the reflected signals to be appreciably less than unity. Therefore, a similar loss must be included in the lower arm 104, for instance by forming the reflector 120 at a small angle with respect to the waveguide, or by including a loss in the waveguide 104. Ideally, the magnitude of the reflected signals in both the upper arm 106 and the lower arm 104 should be substantially equal for optimum performance of the filter 100.

Figure 2:
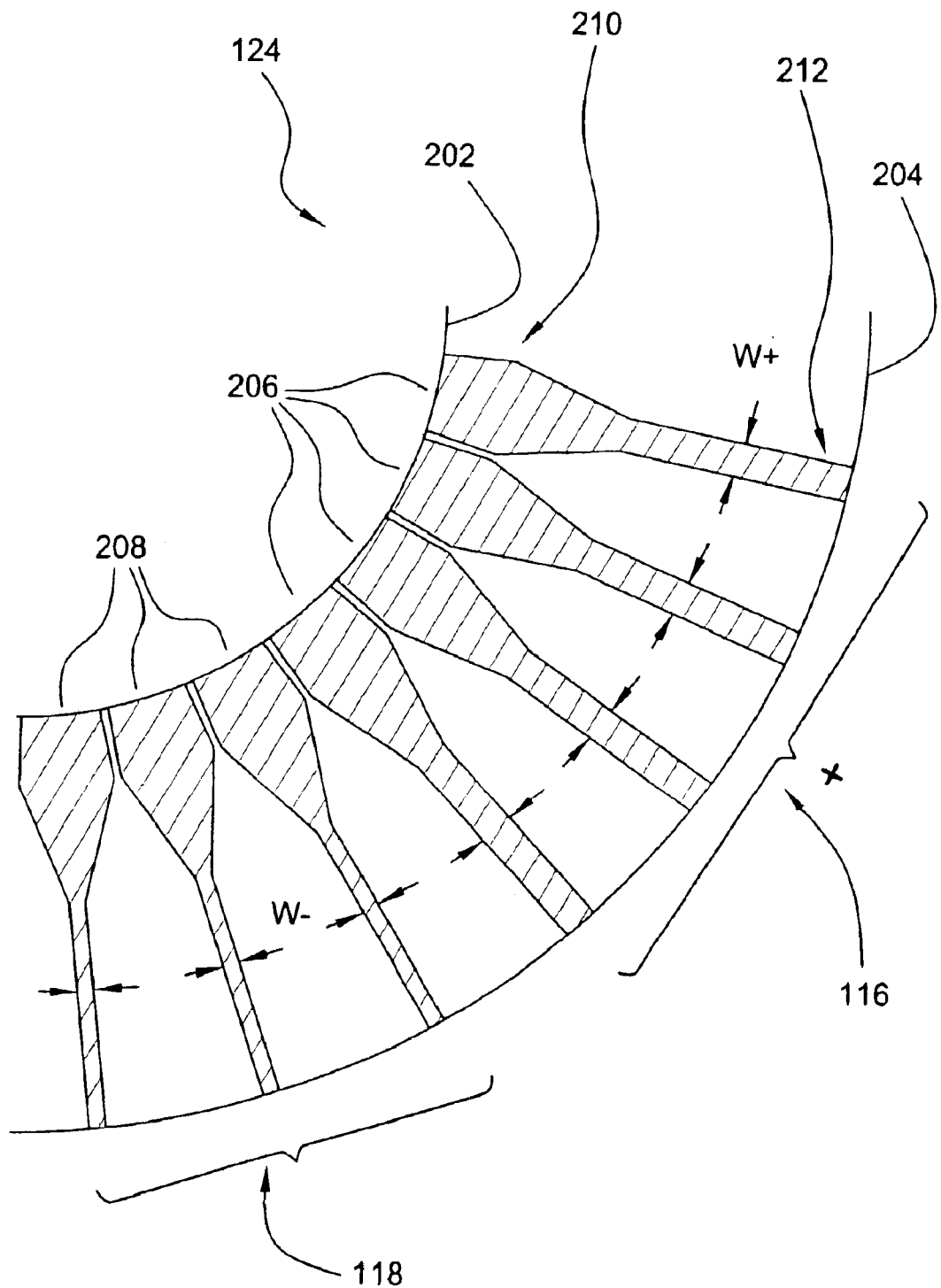
FIG. 2 depicts a detailed view of one embodiment of a back wall portion of the filter of FIG. 1.

FIG. 2 depicts a detailed view of one embodiment of a back wall formed at the image circle 124 of the second free space region 112 of the WGR 108. Specifically, the back wall 124 is two concentric surfaces, namely, an image surface 202 and a reflector surface 204. A radial array of waveguides 206 and 208 are disposed between the image surface 202 and the reflector surface 204. That is, a proximal end 210 of the radial array of waveguides communicates with the image surface 202 and a distal end 212 of the radial array of waveguides communicates with the reflector surface 204. A first set of the radial array of waveguides 206 corresponds to the first reflective region 116 and a second set of the radial array of waveguides 208 corresponds to the second reflective region 118.

In one embodiment, all waveguides in the array are of equal physical length. Thus, some other feature must be altered so as to establish in the phase shift $\pi$ in alternating regions. The phase shift $\pi$ is realized by altering a width W+ of the distal ends of the radial array of waveguides in the first reflective region 116 in comparison to the width W− of the distal ends in the second reflective region 118 to establish a periodic array of radial waveguides. Optical theory provides, typically, that the wider a given waveguide is shaped, the longer the optical path for a signal propagating through such waveguide. Typically, W− must be small enough so that only a fraction of the signal power propagates inside waveguides in the second reflective region 118 whereas W+ must be large enough to cause a substantially larger fraction of the signal power to propagate within waveguides in the first reflective region 116 . For instance, W+ may be chosen to be twice W−, or wider. One skilled in the art will realize that the widths W+ and W− can be altered in any manner suitable to achieve the desired results. Notice, for any given W+ and W−, the appropriate phase shift can be realized by appropriately choosing the waveguide length in the end section.

Figure 3:
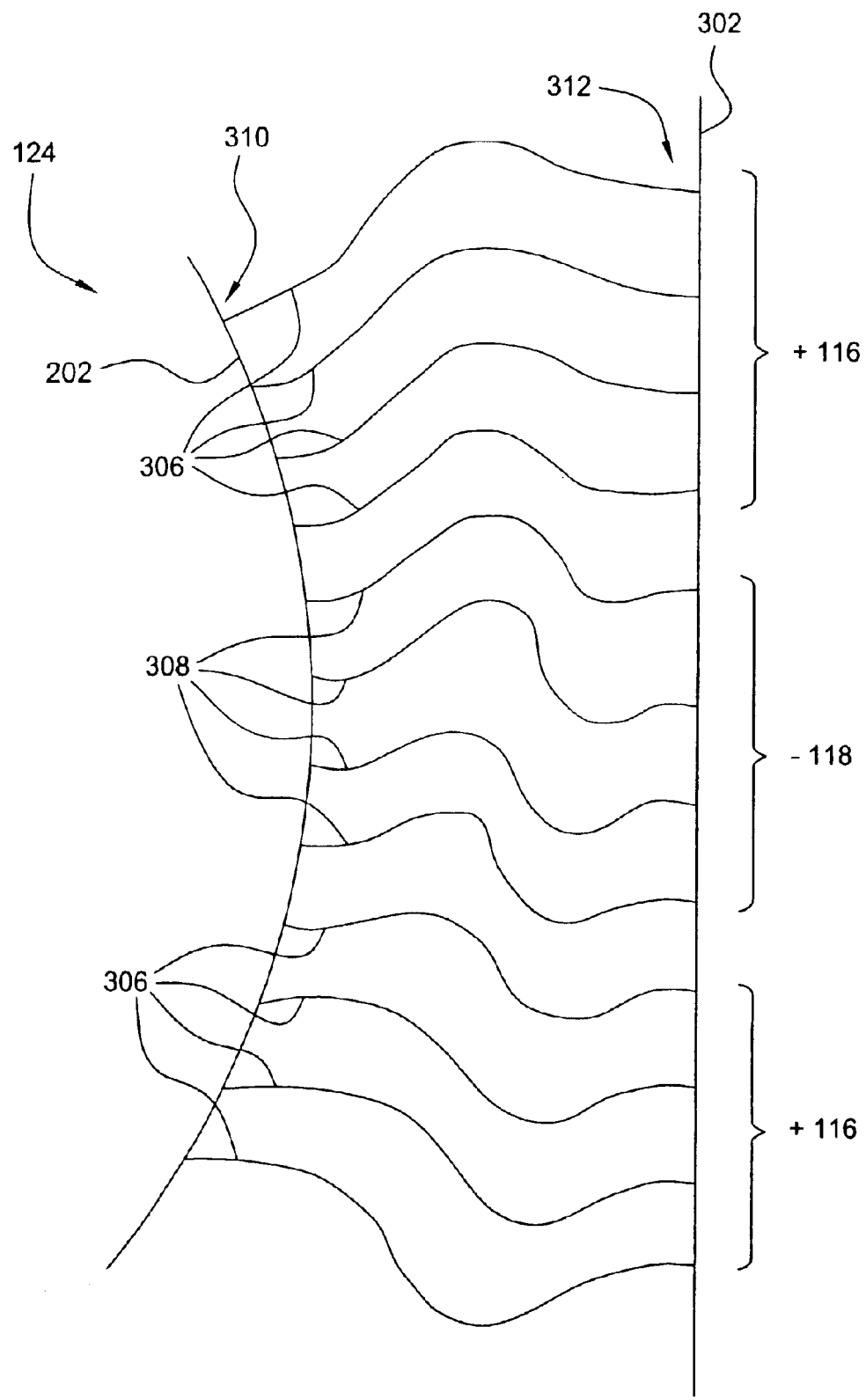
FIG. 3 depicts a detailed view of a second embodiment of a back wall portion of the filter of FIG. 1.

FIG. 3 depicts a detailed view of a second embodiment of a back wall 124 of the filter 100. Specifically, the back wall 124 is one concave surface (the image surface 202) and one flat reflector surface 302. Instead of a radial array of physically equal length waveguides as in FIG. 2, an array of curved waveguides 306 and 308 are disposed between the image surface 202 and the flat reflector surface 302. A proximal end 310 of the curved waveguides is at the image surface 202 and a distal end 312 of the curved waveguides is at the flat reflector surface 302. As in the embodiment of FIG. 2, a first set of curved waveguides 306 corresponds to the first reflective region 116 and a second set of the curved waveguides 308 corresponds to the second reflective region 118. In this case, by using curved waveguides, the appropriate phase shift $\pi$ between adjacent regions (segments) 306 and 308 is realized by choosing different physical lengths for the waveguides of the two regions. As such, and to summarize, the phase shift π is created by changing the optical path length of adjacent regions 206, 208 or 306, 308. The optical path length is altered by changing the physical width or physical length of the desired waveguide. A combination of altering length and width is also within the scope of the invention.

Figure 4:
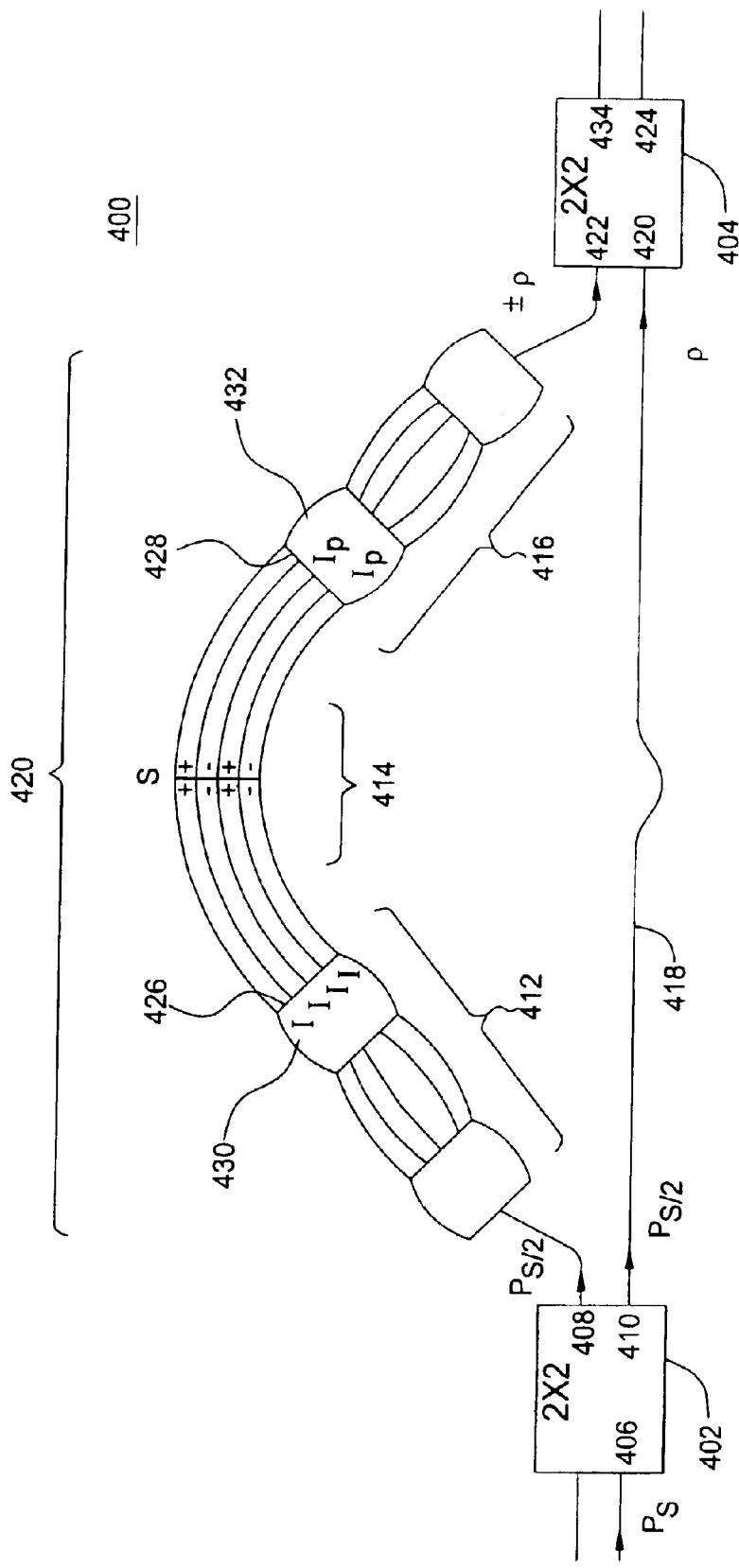
FIG. 4 depicts a high level block diagram of an alternate embodiment of the filter of the present invention.

FIG. 4 depicts a high level block diagram of an alternate embodiment of the filter of the present invention. Specifically, a filter 400 that provides the same results as that of the two circulator filter 100 is shown, but without the use of circulators. The use of circulators is avoided in the filter 400 of FIG. 4 by using two couplers 402, 404 and two gratings 412, 416 arranged symmetrically about an additional waveguide array 414. This arrangement consists of two identical halfs separated by a symmetry line S. For example, by cutting the first half along the symmetry line S, and including a flat reflector along the cut, one obtains the reflective arrangement considered previously, in the arrangement of FIG. 3.

First coupler 402 is arranged and performs essentially in the same manner as coupler 102 of FIG. 1 by splitting the input signal Ps applied to a first coupler input port 406 into two equal component signals Ps/2 at first and second output ports 408 and 410 respectively. A lower arm 418 of the filter 400 passes one of the equal component signals Ps/2 to a first input port 420 of a second coupler 404. This lower arm 418 has the same transmission coefficient characteristics ρ as the lower arm 104 of filter 100.

An upper arm 420 of the filter 400 has a different construction and arrangement than that of filter 100, but the two arrangements are equivalent. That is, the transmission coefficient of filter 400 has essentially the same behavior ±ρ as the reflection coefficient of the upper arm 108 of filter 100. In detail, upper arm 420 has a first arrayed waveguide grating 412 connected to the first output port 408 of the first coupler 402. The first arrayed waveguide grating 412 has a rear free space region 430 (similar to the second free space region 112 of filter 100) and a back wall 426 of the rear free space region 430. A second arrayed waveguide grating 416 mirrors the first arrayed waveguide grating 412 and is connected to a second input port 422 of the second coupler 404. The second arrayed waveguide grating 416 has a front free space region 432 with a front wall 428.

A waveguide array 414 is disposed between the first arrayed waveguide grating 412 and second arrayed waveguide grating 416. Specifically, the waveguide array 414 is connected to the back wall 426 and front wall 428. This arrangement duplicates the physical conditions of the curved waveguide array of FIG. 3 about either side of symmetry line S. That is, a series of images I are formed at a back wall 426 of the rear free space region 430 as a result of the applied component signal Ps/2. Certain ones of these images appear at a + transmissive region (denoted by + about symmetry line S) and certain ones of these images appear at a − transmissive region (denoted by − about symmetry line S) as they propagate through the waveguide array 414. Each region is formed by a segmented array with different optical length in adjacent segments. Thus, all images produced at a particular wavelength recombine in phase with transmission coefficient ±ρ at the output 422 of the second arrayed waveguide grating 416. Images having a +ρ transmissive coefficient on upper arm 420 will recombine with Ps/2 of the lower arm 418 and the resultant signal Ps will appear at first output port 434 of second coupler 404. Similarly, for images having a −ρ transmission coefficient on upper arm 420, the resultant signal Ps will appear at second output port 424 of second coupler 404. Thus, the function of the filter 400 is the same as filter 100 without the need for circulators. As indicated above with respect to filter 100, filter 400 also realizes a substantially rectangular transfer function and extremely low loss (theoretically close to zero) by virtue of the port characteristics of the couplers 402 and 404.

A method of processing optical signals (either separating or multiplexing) is also realized by the subject invention. Specifically, an input signal is applied to an optical device to split the input signal into two substantially equal components. The component input signals are propagated through respective arms that are connected to the optical splitting device. A first arm has non-phase shifting characteristics and a second arm has phase-shifting characteristics so as to alter the phase of the component input signals relative to each other. As a result of propagating through the first arm, the component input signal applied to the first arm is imparted with a first reflection coefficient. As a result of propagating through the second arm, the component input signal applied to the second arm is imparted with a second reflection coefficient. The first reflection coefficient may be substantially the same as the second reflection coefficient or substantially opposite to the second reflection coefficient. The component signal imparted with the first reflection coefficient (in the first arm) and the component signal imparted with the second reflection coefficient (in the second arm) are received at an optical device for combining the component signals. If the component signal of the first arm is in phase with the component signal of the second arm, an output signal is provided at a first output port of the optical combining device. If the component signal of the first arm is out of phase with the component signal of the second arm, an output signal is provided at a second output port of the optical combining device. In the embodiment of FIG. 1 it is understood that the first output port for the output signal is the branch of first circulator 114 and the second output port the output signal is the branch of second circulator 115.

Although various embodiments that incorporate the teachings of the present invention have been shown and described in detail herein, those skilled in the art can readily devise many other varied embodiments that still incorporate these teachings.

What is claimed is:

1. An optical channel fitter comprising:
   at least one coupler adapted to have an optical input signal applied thereto;
   an imaging arrangement comprising at least one arrayed waveguide grating connected to the coupler and having a phase shifting region that is divided into alternating regions of different optical lengths for shifting the phase of a first part of the applied input signal in relation to a second part of the applied input signal.

2. The apparatus of claim 1, wherein the at least one coupler is a single 2×2 coupler having a first input port, a second input port, a first output port and a second output port.

3. The apparatus of claim 2, wherein the at least one coupler performs equal power splitting of an applied input signal.

4. The apparatus of claim 2, wherein the first output port is connected to a filter lower arm having a reflector.

5. The apparatus of claim 2, wherein the second output port is connected to a filter upper arm having at least one arrayed waveguide grating.

6. The apparatus of claim 2, wherein a first circulator is connected to the first input port and a second circulator is connected to the second input port.

7. The apparatus of claim 1, wherein the phase shifting region is a back wall of a free space region of the arrayed waveguide grating.

8. The apparatus at claim 7, wherein the back wall of the free space region further comprises a reflector surface arranged concentrically with an image surface of the imaging arrangement.

9. The apparatus of claim 8, wherein a plurality of radial waveguides are disposed between the image surface and the reflector surface.

10. The apparatus of claim 9, wherein the plurality of radial waveguides are divided into said alternating regions of as a first set of radial waveguides with a first optical length and a second set of radial waveguides, with a second optical length.

11. The apparatus of claim 10 wherein a width of the first set radial waveguides is wider than a width of the second set of radial waveguides.

12. The apparatus of claim 7, wherein the back wall of the free space region further comprises a curved image surface and a flat reflector surface spaced apart from each other.

13. The apparatus of claim 12, wherein a plurality of curved waveguides are disposed between image surface and a reflector surface.

14. The apparatus of claim 13, wherein the plurality of curved waveguides are divided into said alternating regions as a first set of curved waveguides with a first optical length and a second set of curved waveguides, with a second optical length.

15. The apparatus of claim 14 wherein a physical length of the first set of curved waveguides is longer than a physical length of the second set of curved waveguides.

16. The apparatus of claim 1, wherein the at least one coupler is a first 2×2 coupler having a first input port, a second input port, a first output port and a second output port and a second 2×2 coupler having a first input port, a second input port, a first output port and a second output port.

17. The apparatus of claim 16 wherein the at least one arrayed waveguide grating connected to the coupler and having a phase shifting region is a first arrayed waveguide grating connected between the first output port of the first 2×2 coupler and a second arrayed waveguide grating connected to the second input port of the second 2×2 coupler.

18. The apparatus of claim 17 wherein the first arrayed waveguide grating and a second arrayed waveguide grating are connected to each other via a waveguide array.

19. The apparatus of claim 18, wherein the waveguide array further comprises alternating regions of varying optical lengths of individual waveguides.

20. An apparatus comprising:
a filter adapted to receive an input signal at either of two input ports;
adapted to propagate two equal strength signal portions derived from the input signal along two arms of the filter and
adapted to propagate an output signal at either of two output ports based upon a phase shift of one of the equal strength signal portions implemented in alternating regions of different optical lengths in one of the arms of the filter.

21. The apparatus of claim 20 wherein the phase shift is implemented by providing a plurality of adjacent waveguides arranged according one of the group selected from a change in the physical length of the waveguides and the physical width of the waveguides.

22. A method comprising:
splitting an input optical signal into two or more substantially equal component input signals at an optical splitting device;
propagating each of said component input signals into respective arms having respective reflection coefficients;
altering said component input signals according to the respective reflection coefficients;
receiving the reflection coefficient altered component input signals at an optical combining device to generate an output signal; and
providing the output signal to a first port of the optical combining device for an output signal combined from components signals altered by the same reflection coefficient and providing the output signal to a second port of the optical combining device for an output signal combined from components signals altered by different reflection coefficients wherein the altering is performed by passing the component input signal of a first arm through a plurality of waveguides having different widths.

23. The method of claim 22 wherein the splitting step is performed by a 2×2 coupler.

24. The method of claim 22 wherein the receiving step further comprises receiving altered component input signals at an optical device that performed the splitting step.

25. The method of claim 22 wherein the receiving step further comprises receiving altered component input signals at the optical splitting device.

* * * * *